3,344,160
COMPATIBLE CROSSLINKING AGENTS FOR FLUOROSILOXANES
George W. Holbrook, Midland, Mich., assignor to Dow Corning Corporation, Midland, Mich., a corporation of Michigan
No Drawing. Filed Oct. 7, 1963, Ser. No. 314,509
7 Claims. (Cl. 260—448.2)

ABSTRACT OF THE DISCLOSURE

The compositions are of the class of organosilicon compounds of the general formula

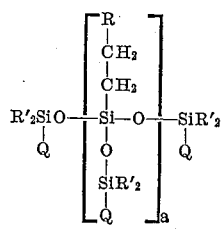

which have utility as novel, compatible crosslinking and branching agents for siloxane polymers and copolymers. They also have utility as crosslinking agents for polysiloxanes that possess fluorinated hydrocarbon side chains. Illustrative of the compositions claimed herein is the compound

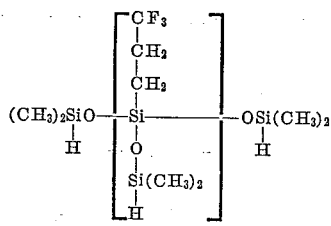

Illustrative of the preparation is the following:

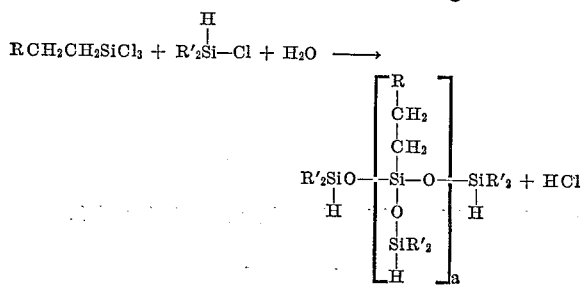

This invention relates to new compatible crosslinking and branching agents for siloxane polymers and copolymers. They have special utility as crosslinking agents for polysiloxanes that possess fluorinated hydrocarbon side chains.

This invention may also be used as an intermediate in the production of homopolymeric resins containing fluorinated hydrocarbon side chains.

The subject of this invention is a composition of matter of the formula

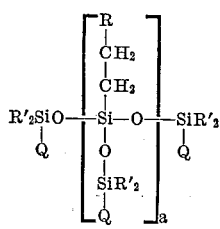

Q can be hydrogen, hydroxy, or alkoxy radicals, R is a perfluoroalkyl radical of 1 through 8 carbon atoms, R' is selected from the group consisting of monovalent hydrocarbon radicals of 1 through 6 carbon atoms and —CH$_2$CH$_2$R radicals, there being no more than one of the latter attached to any one silicon atom, and $a$ is an integer of 1 through 3.

Q can be, among others, hydrogen, hydroxyl, methoxy, ethoxy, octadecoxy, isopropoxy, hexoxy, etc.

R can be, among others, trifluoromethyl, perfluoroethyl, perfluorohexyl, perfluoroisopropyl, perfluorooctyl, etc.

R' can be, among others, methyl, ethyl, isopropyl, hexyl, cyclohexyl, phenyl, vinyl, allyl, cyclohexenyl, 3,3,3-trifluoropropyl, β-perfluorooctylethyl, β-perfluoroisopropylethyl, etc.

When Q is to be hydrogen the materials of this invention can be made by the following generic reaction in the presence of a solvent such as toluene:

(1)

RCH$_2$CH$_2$SiCl$_3$ + R'$_2$SiHCl + H$_2$O $\longrightarrow$

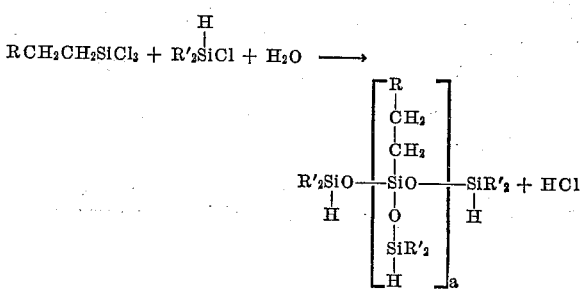

The reaction usually proceeds at room temperature, or on gentle heating. It is usually exothermic, and precautions may be needed to keep the reaction temperature down.

The product will almost always be a mixture of products with varying values of $a$. They can be separated by fractionation. The major fractions are the products where $a$ equals 1, 2 and 3.

The relative yield of the various fractions can be controlled by the relative proportions of the reactants. Thus, when a large excess of

is used, the primary product is that in which $a$ is 1. When less than one mol of R'$_2$SiHCl per mol of RCH$_2$CH$_2$SiCl$_2$ is used the primary products are those where $a$ is 2 or 3.

When Q is to be alkoxy, the materials of this invention can be made in the following manner:

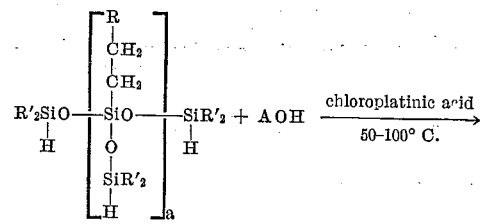

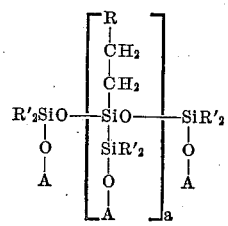

where A is an alkyl radical. The reaction is exothermic, so precaution must be taken to prevent too violent a reaction through overheating.

When Q is to be hydroxy, the materials of this invention can be made in the following manner:

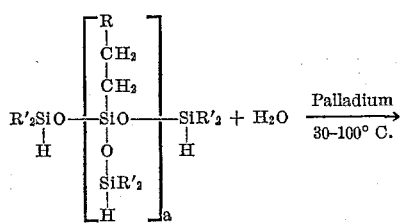

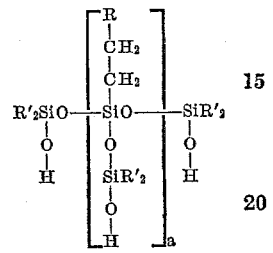

The materials of this invention are useful as crosslinking and chain branching agents for siloxane polymers and copolymers. Those materials containing SiH can be used with polymers that contain aliphatic unsaturation. The reaction can proceed in the following manner:

(2)

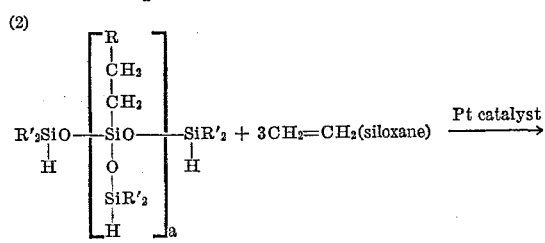

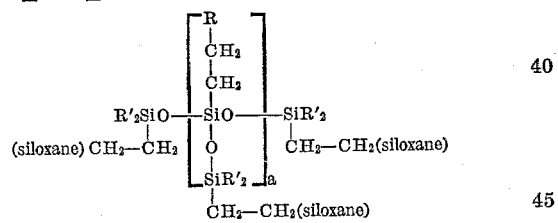

It should be noted that if R' contains aliphatic unsaturation, the R' groups will compete in the reaction causing the crosslinking groups to crosslink with themselves, in part.

When Q is alkoxy or OH the materials of this invention can also be used as crosslinking or chain branching agents for siloxane copolymers. This can be done by cohydrolyzing or cocondensing the instant compositions with hydrolyzable silanes or other siloxanes by conventional methods.

The materials of this invention are also useful as intermediates in the production of fluorine-substituted homopolymers. The Q groups are hydrolyzed and condensed with each other, forming a homopolymer:

(3)

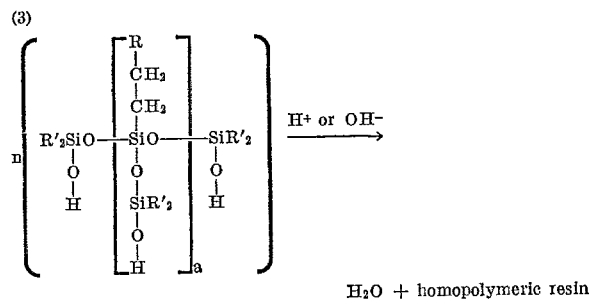

H₂O + homopolymeric resin

The materials of this invention are especially useful for the purpose of crosslinking polysiloxanes that contain fluorine-substituted hydrocarbon substituents. Since fluorine substitution also occurs in the crosslinking agent, copolymeric resins with uniformly spaced fluorine-substituted units can be made by use of these materials.

The following examples are illustrative only and are not to be construed to limiting the invention which is properly set forth in the appended claims.

*Example 1*

3255 g. of dimethylchlorosilane, 4038 g. of 3,3,3-trifluoropropyltrichlorosilane, and 10 liters of toluene were mixed and slowly added with stirring to 5460 g. of water. The product was separated, washed with water until neutral, dried, filtered and fractionated.

The following products were isolated:

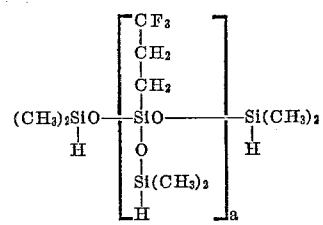

consisting of 1885 g. of the product where $a$ equals 1, 1141 g. of the product where $a$ equals 2, and 346 g. of the product where $a$ equals 3.

*Example 2*

When 1 mole of trifluoropropyltrichlorosilane is cohydrolyzed with 1.2 mols of trifluoropropylmethylmonochlorosilane in accordance with the procedure of Example 1 the compounds

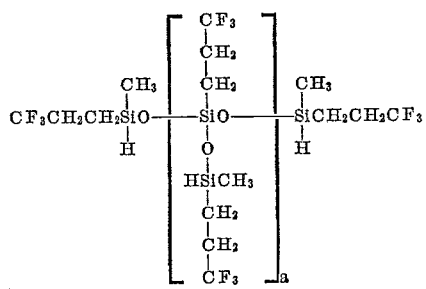

are obtained in which $a$ has the value 1, 2 and 3.

*Example 3*

When one mole of heptadecylfluorodecyltrichlorosilane is cohydrolyzed with 1.2 moles of heptadecylfluorodecylmethylmonochlorosilane in accordance with procedure of Example 1 the compounds

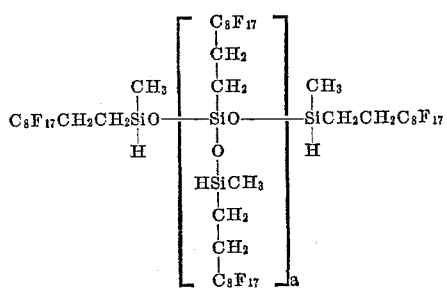

are obtained where $a$ is 1, 2 and 3.

Example 4
When the following reactions are carried out, the resulting products are obtained:
(a) 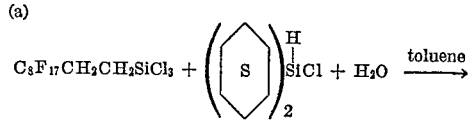
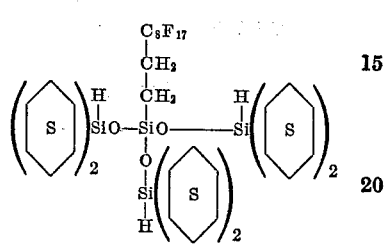
(b) 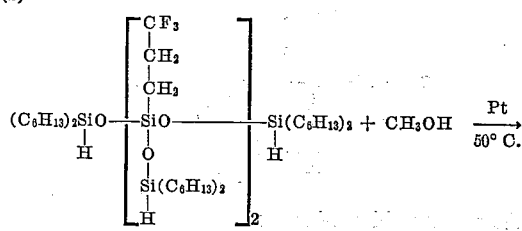
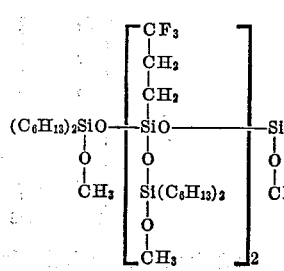
(c) 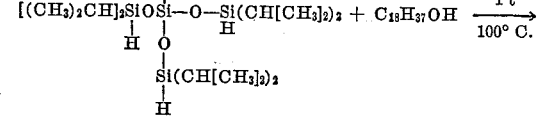
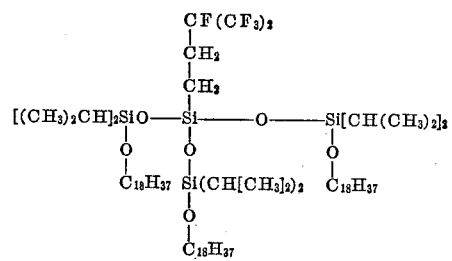
(d) 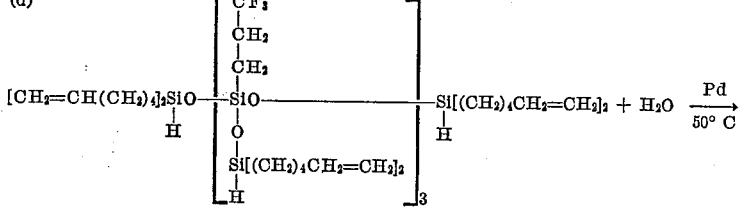
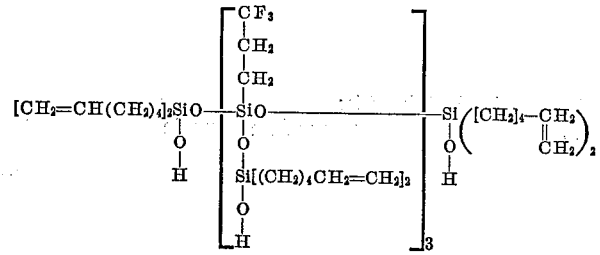
(e) 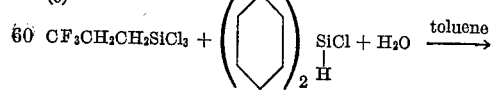
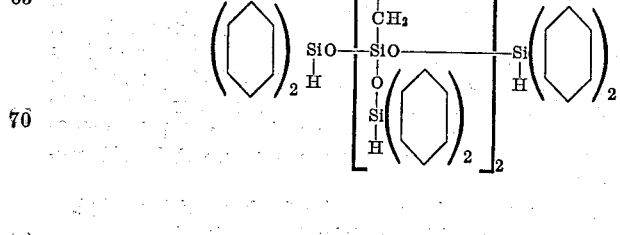

(f) 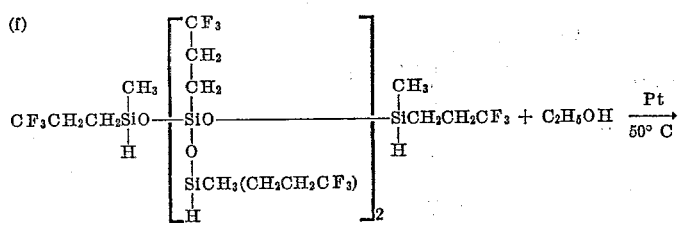

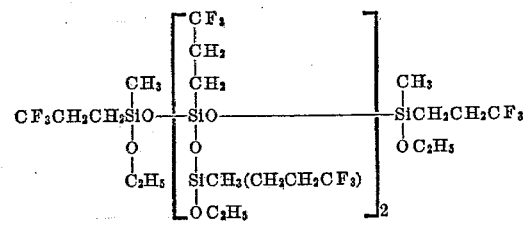

(g) 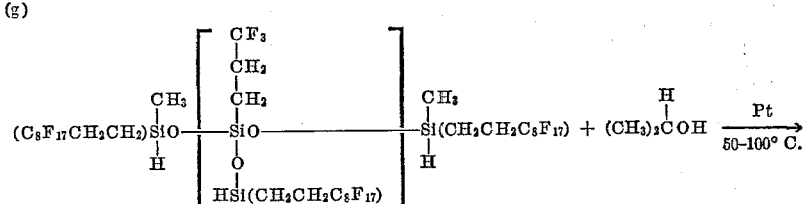

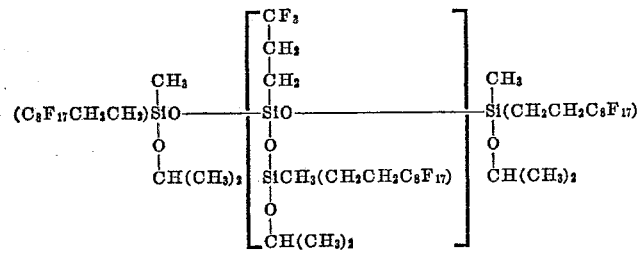

That which is claimed is:
1. A composition of matter of the formula

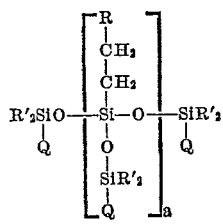

where Q is selected from the group consisting of hydrogen, hydroxy, and alkoxy radicals, R is a perfluoroalkyl radical of 1 through 8 carbon atoms, R' is selected from the group consisting of monovalent hydrocarbon radicals of 1 through 6 carbon atoms and —$CH_2CH_2R$ radicals, there being no more than one of the latter attached to any one silicon atom, and $a$ is an integer of 1 through 3.

2. The composition of claim 1 where R is trifluoromethyl.
3. The composition of claim 1 where R' is methyl.
4. The composition of claim 1 where Q is H.

5. As a composition of matter

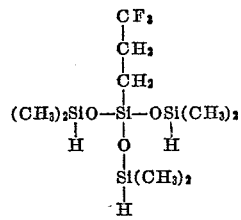

6. As a composition of matter

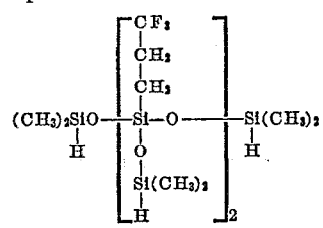

7. As a composition of matter

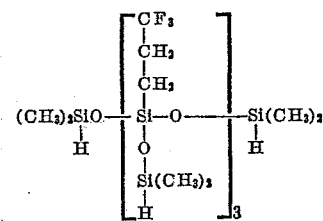

(References on following page)

References Cited

UNITED STATES PATENTS

| | | | |
|---|---|---|---|
| 2,469,890 | 5/1949 | Patnode | 260—448.2 |
| 2,823,218 | 2/1958 | Speier et al. | 260—448.2 |
| 2,951,862 | 9/1960 | Pierce | 260—448.8 |
| 2,967,170 | 1/1961 | Merker | 260—448.2 |
| 2,967,171 | 1/1961 | Barnes et al. | 260—448.2 |
| 3,015,585 | 1/1962 | Holbrook et al. | 260—448.8 |
| 3,260,699 | 7/1966 | Schmidt | 260—448.8 |

TOBIAS E. LEVOW, *Primary Examiner.*

P. F. SHAVER, *Assistant Examiner.*